3 Sheets—Sheet 1.

F. RHIND.

CENTRAL DRAFT LAMP.

No. 11,436. Reissued Aug. 28, 1894.

WITNESSES

H. A. Lamb

Susie V. Richardson.

INVENTOR

Frank Rhind

By A. M. Wooster

Atty.

THE NORRIS PETERS CO., PHOTO-LITHO., WASHINGTON, D. C.

3 Sheets—Sheet 2.

F. RHIND.

CENTRAL DRAFT LAMP.

No. 11,436. Reissued Aug. 28, 1894.

WITNESSES

H. A. Lamb

Susie V. Richardson

INVENTOR

Frank Rhind

By A. M. Wooster

Atty.

THE NORRIS PETERS CO., PHOTO-LITHO., WASHINGTON, D. C.

F. RHIND.

CENTRAL DRAFT LAMP.

No. 11,436. Reissued Aug. 28, 1894.

WITNESSES

H. A. Lamb
Susie V. Richardson

INVENTOR

Frank Rhind
By A. M. Wooster
Atty.

THE NORRIS PETERS CO., PHOTO-LITHO., WASHINGTON, D. C.

UNITED STATES PATENT OFFICE.

FRANK RHIND, OF MERIDEN, ASSIGNOR OF ONE-HALF TO THE BRIDGEPORT BRASS COMPANY, OF BRIDGEPORT, CONNECTICUT.

CENTRAL-DRAFT LAMP.

SPECIFICATION forming part of Reissued Letters Patent No. 11,436, dated August 28, 1894.

Original No. 501,025, dated July 4, 1893. Application for reissue filed November 27, 1893. Serial No. 492,155.

*To all whom it may concern:*

Be it known that I, FRANK RHIND, a citizen of the United States, residing at Meriden, in the county of New Haven and State of Connecticut, have invented certain new and useful Improvements in Central-Draft Lamps, of which the following is a specification, reference being had therein to the accompanying drawings.

My invention relates to central draft oil burning lamps and has for its general object to simplify and improve their construction and to increase their durability in use.

With these ends in view I have devised the improved lamp which I will now describe referring by numbers to the accompanying drawings forming part of this specification, in which—

Figure 1:
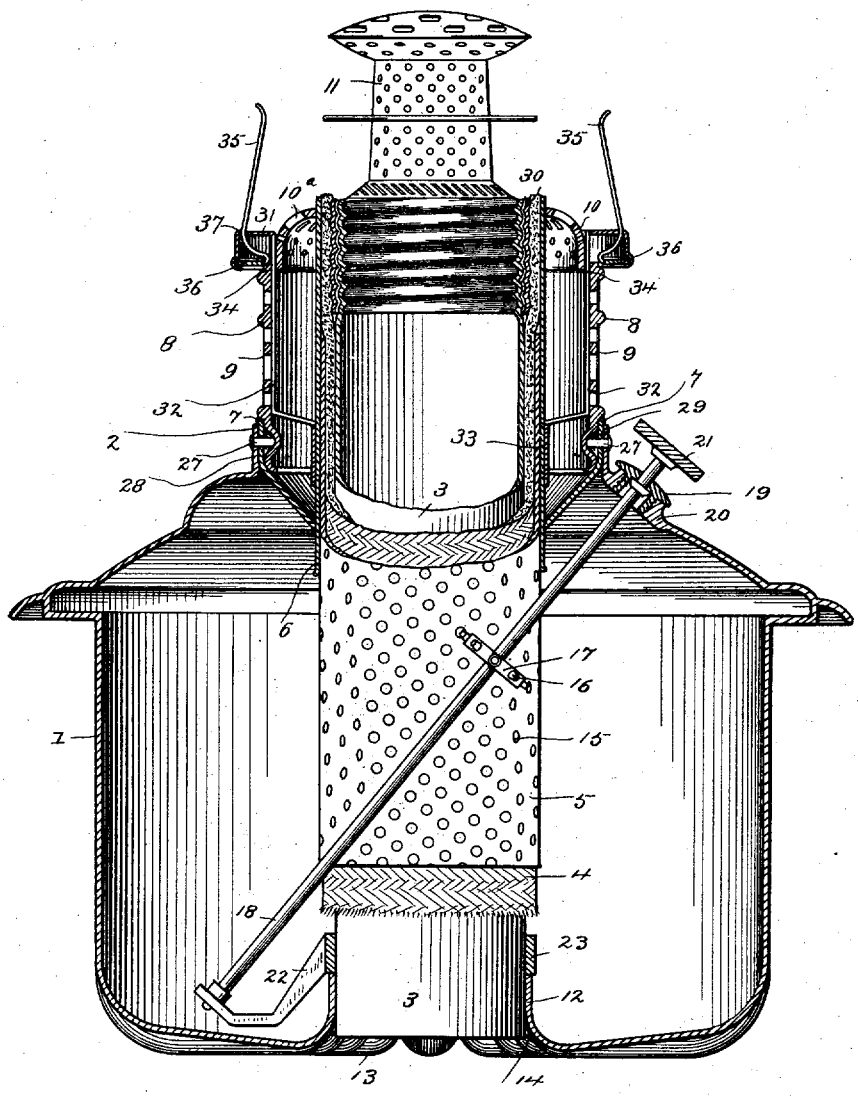
Figure 2:
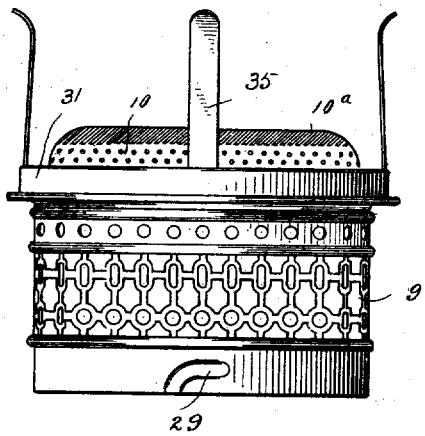
Figure 3:
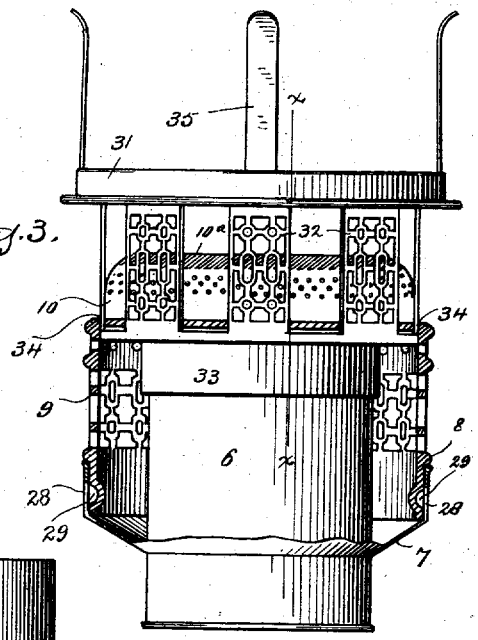
Figure 4:
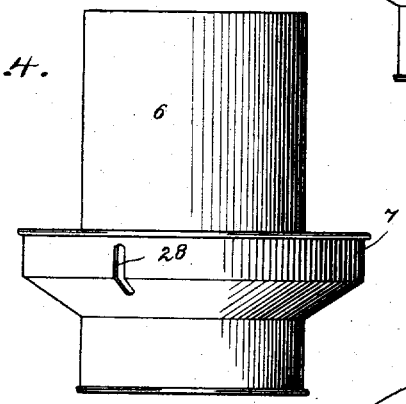
Figure 5:
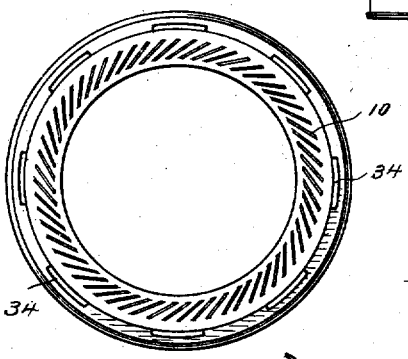
Figure 6:
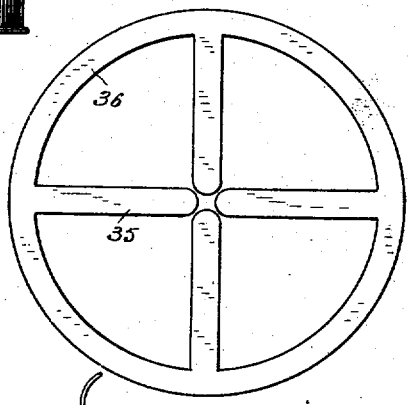
Figure 7:
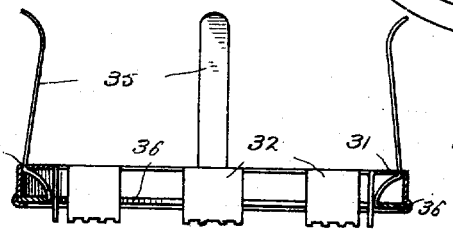
Figure 8:
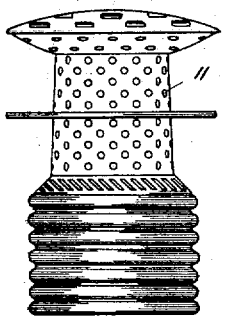
Figure 10:
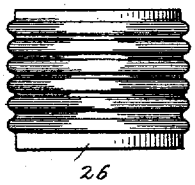
Figure 9:
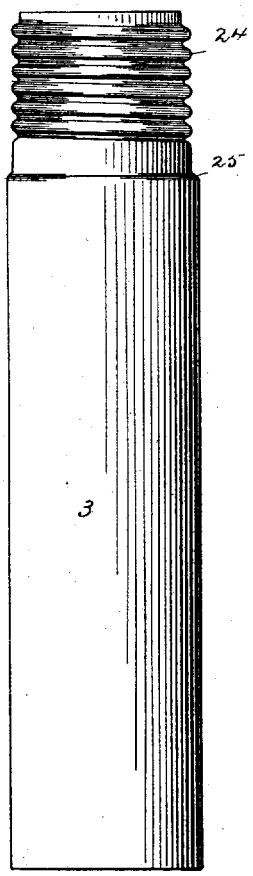
Figure 11:
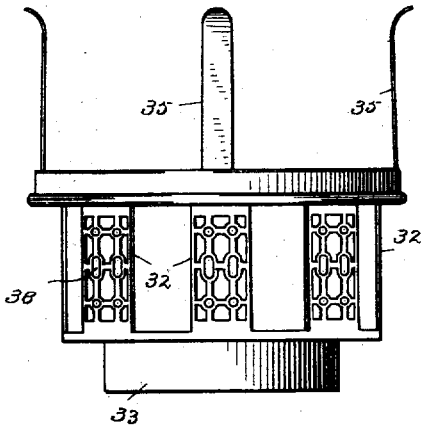

Figure 1 is a central vertical section of my improved lamp, the inner air distributer and the wick raising mechanism being in elevation and the inner air tube and wick partly in elevation; Fig. 2, an elevation of the body of the burner the chimney gallery being at its normal position; Fig. 3, a section of the body and the base, the wick tube being in elevation, and the chimney gallery in elevation and at the raised position; Fig. 4, an elevation of the wick tube and the burner base detached; Fig. 5, a plan view of the body detached; Fig. 6, a plan view of the chimney springs and ring as blanked out; Fig. 7, a section of the chimney gallery; Fig. 8, an elevation of the inner air distributer detached; Fig. 9, an elevation of the inner air tube detached; Fig. 10, an elevation of the removable sleeve detached, and Fig. 11 is an elevation of the chimney gallery, standards and holding ring detached.

1 denotes an oil reservoir.

I have shown my improvements as applied to the oil reservoir or fount of an ordinary vase lamp, a single illustration being deemed sufficient for the purposes of this specification. It should be understood however that my improvements are equally applicable to lamps in which the oil reservoir is not removable but is fixed to a vase or standard.

2 denotes the burner collar, 3 the inner air tube, 4 the wick, 5 the wick raiser, 6 the wick tube which has formed integral with it or rigidly secured thereto an outwardly extending flange designated by 7 which I term the burner base, 8 the burner body which is provided with perforations 9 constituting the outer air supply, 10 the outer air distributer, and 11 the inner air distributer.

10ª denotes a series of elongated openings in the outer air distributer. These openings are placed obliquely so that vertical lines on the surface of the distributer must pass through one or more of the openings. By this means air is supplied to the flame in a sheet rather than in jets and serration of the flame is avoided. By making these openings elongated instead of circular the tendency of the air currents to assume a whirling motion as they pass through the openings is wholly avoided. It is found in practice that to produce an intense white flame it is necessary to supply a large volume of air. A large number of small perforations has been found in practice not to supply the requisite volume of air owing to frictional resistance to the passage of air through the perforations. It has been attempted to remedy the difficulty by increasing the size and number of perforations, but this is objectionable for the reason that it weakens the part so that it is liable to be crushed or bent out of shape in transportation and use, and furthermore the circular openings fail to accomplish the desired result owing to the fact that the air passes to the flame with a whirling motion. These difficulties however, I wholly overcome by providing a series of elongated openings in the outer air distributer which I place obliquely. I am thus enabled to supply to the flame a sufficiently large volume of air to give the best possible result, to supply it in the form of a sheet instead of in whirling jets and furthermore to retain sufficient metal in the part to give ample strength to withstand the strain of transportation and ordinary usage. In the bottom of the reservoir is the usual opening in which the lower end of the inner air tube is secured. In the present instance the metal of the reservoir is shown as turned inward forming a collar 12 which surrounds and supports the inner air tube.

In order to strengthen the base of the reservoir and to more firmly brace and support the inner air tube, and in order furthermore to provide air passages leading into the inner air tube so that the burner may be lighted if required when the reservoir is not in a vase but standing on a table, I form radial corrugations 13 in the bottom of the reservoir which extend around the outer edge and a short distance up the side of the reservoir and which also extend a short distance upward into collar 12 which surrounds the opening in the bottom and receives the inner air tube. After the parts are assembled the inner air tube is secured in place by solder as at 14.

The wick raiser is provided with perforations 15 which are engaged by pins 16 on the periphery of a wheel 17 carried by wick raising shaft 18. The outer end of shaft 18 is supported in a cap 19 which is threaded to engage a hub 20 and is provided with a finger piece 21 for convenience in operation. The wick raising shaft extends downward into the reservoir diagonally, its lower end being journaled in an arm 22 extending outward from a collar 23 which is rigidly secured to the inner air tube. This construction and arrangement of parts does away with one of the most serious difficulties in assembling the parts of this class of lamps as heretofore constructed.

In assembling the parts of my improved lamp it is simply necessary to place the lower end of shaft 18 in its bearing in arm 22 and to turn the inner air tube until the shaft, wheel and pins are in the required position to engage the perforations in the wick raiser to raise the wick freely and easily. When the parts are in this position the inner air tube is soldered in place as already described thereby making a very firm structure that will stand any reasonable amount of hard usage without injury. It will of course be apparent that rotation of shaft 18 will raise or lower the wick carrier and wick with a spiral movement. The upper end of the inner air tube is slightly reduced in diameter and is provided with an internal and external thread 24 which is engaged by a corresponding thread on inner air distributer 11. I find in practice that it is a great advantage to have this inner air distributer retained in place by a thread.

It is of course well understood that in use and even when not in use there is a tendency for oil to run up the wick by capillary attraction. As burners are ordinarily constructed oil that rises to the top of the wick in excess of the quantity that can be consumed will pass over and down the inner side of the inner air tube frequently causing serious damage to table cloths, &c. In order to overcome this objection some makes of lamps have been provided with a sleeve outside of the inner air tube, said sleeve lying between said air tube and the wick. These sleeves overcome the objection as the oil will not pass a chasm, but when a passage is provided between the air tube and the wick the surplus oil will run down said passage. As heretofore constructed these sleeves have either been held in place by frictional contact or have been soldered in place. The former plan is objectionable for the reason that the sleeve is frequently lifted up with the wick in raising the latter, and the latter plan is objectionable for the reason that when the tube is soldered in place the passage between it and the air tube quickly becomes stopped up with dirt and practically useless. In my improved lamp I provide a sleeve 26 upon which I form a thread which loosely engages thread 24 on the inner air tube. I thus secure the sleeve firmly in place and prevent its being lifted in raising the wick, and also permit it to be readily removed at any time for cleaning, and as readily replaced. By threading the wick tube I gain an additional advantage in that a channel or gutter indicated by 30, see Fig. 1, is provided between the wick and the sleeve for the oil to run down, as the wick in practice does not sink down into the depressions in the sleeve. The lower end of the sleeve ordinarily in use rests upon a shoulder 25 on the inner air tube.

The burner as a whole is secured to the reservoir by means of lugs 27 on the inner sides of the burner collar which pass through slots 28 in the base and engage curved slots 29 in the body. The base fits closely within collar 2 and is held against turning by the engagement of lugs 27 with slots 28. It will be seen that when lugs 27 are in engagement with slots 29, the body and base are both locked firmly to the reservoir. Rotation of the body backward causes lugs 27 to ride down the inclines of the slots thereby disengaging the body and leaving the base in position. Should it be required at any time to remove the base it can easily be done by lifting it straight out. In practice however the removal of the body does not disturb the base and the locking of the body locks the base also firmly in place.

31 denotes the chimney gallery, 32 standards extending downward therefrom, and 33 a ring at the lower end of the standards which slides over the wick tube thereby keeping the chimney gallery and standards perfectly firm in use so that the gallery and chimney carried thereby may be lifted up and down easily and smoothly and all looseness and wabbling motion of the gallery and chimney is prevented. The outer air distributer fits closely within the body at its upper end, said parts being rigidly secured together and slots 34 being provided to receive the standards. This air distributer as a matter of fact has three functions. In addition to serving as an air distributer it forms a rigid support for the upper end of the wick tube thereby keeping said wick tube perfectly central in the lamp which is especially important in a burner having a lifting chimney gallery, and moreover serving as a cover to exclude cinders, burned matches, &c., from the chamber in the base, that is to say it prevents anything from passing down between the wick tube and the body.

35 denotes the chimney springs which are blanked out integral with a ring 36, said springs being formed from the scrap metal within the ring. The chimney gallery, standards and ring 33 are formed from a single drawn shell, the upper end of this shell being turned outward at right angles to the standards to form the gallery and then turned downward at right angles again and curved about the edge of ring 36 thereby locking the latter in place as clearly shown in Figs. 1 and 7. Slots 37 are formed in the chimney gallery and the chimney springs are bent upward from the position shown in Fig. 6 and passed through these slots, and then bent to the required shape to hold a chimney as clearly shown in Fig. 7.

I have already described the burner body as provided with perforations 9.

A very important feature of my improved burner is that standards 32 are provided with perforations 38 which correspond exactly with perforations 9 in the body when the chimney gallery is at the lowered position as in Figs. 1 and 2. This registration of perforations 9 and 38 I find to be very important in practice as it enables me to use any reasonable number of standards so long as sufficient room is left to insert a match in lighting, thereby insuring the greatest possible strength and rigidity, while at the same time it wholly prevents marking of the flame as it is called, owing to imperfect combustion where the outer air supply is interfered with. For this reason all other burners, so far as I am aware, having chimney galleries which lift straight up have had only two supports for the gallery which have been made as small as possible and placed as far inward as possible so that the raising and lowering of the gallery has been unsteady, and even then these standards have marked the flame. In the present instance by using more standards and making them wider I am enabled to perforate the standards to correspond with the perforations of the body thereby wholly preventing any marking of the flame.

Having thus described my invention, I claim—

1. The combination with an oil reservoir, an inner air tube and a wick raiser, of a collar 23 secured to said air tube, an arm 22 extending from said collar, and a wick raising shaft the lower end of which is journaled in said arm.

2. The combination with a wick raiser and a wick raising shaft carrying a wheel engaging said wick raiser, of an oil reservoir, an inner air tube, a collar 23 secured to said tube, and an arm extending from said collar in which the lower end of the wick raising shaft is journaled.

3. The combination with an inner air tube having at its upper end an internal and an external screw thread, of an inner air distributer threaded to engage the internal thread, and a sleeve threaded to engage the external thread and lying between the wick and the air tube so that neither sleeve nor air distributer can be raised by the wick and a channel is left for oil to run down between the wick and the depressions in the sleeve substantially as described.

4. The combination with an inner air tube having an internal and external thread, of an inner air distributer engaging said thread from the inner side, and a sleeve engaging said thread from the outer side substantially as described.

5. The combination with an inner air tube having a shoulder 25 and thread 24, of an inner air distributer engaging said thread from the inner side, and a sleeve engaging said thread from the outer side and resting upon said shoulder.

6. The combination with an inner air tube having a thread 24, of an inner air distributer and a sleeve 26 lying outside of said tube, a space being left between said tube and sleeve for the purpose set forth, and said sleeve being provided with a thread as shown so that a channel is formed between the wick and the sleeve as and for the purpose set forth.

7. The combination with the wick tube, the chimney gallery, the standards and ring 33 engaging the wick tube, of the body, and an outer air distributer secured to the body and fitting closely between the body and the wick tube whereby the latter is supported and retained in its central position.

8. The combination with the wick tube, the body having slots 34, and an outer air distributer lying between the body and the wick tube, of a chimney gallery, standards depending therefrom and passing through said slots, and a ring at the lower end of the standards which slides on the wick tube whereby said parts are held firmly against other than vertical movement.

9. The combination with the chimney gallery having slots 37 of a ring 36 having chimney springs blanked out from the metal within the ring, said springs passing upward through said slots and the metal of the chimney gallery curving over the edge of the ring, thereby securing the parts together.

10. The combination with the body, the wick tube and the chimney gallery separated therefrom to form an air space, of an outer air distributer extending inward from the body and engaging the wick tube, said air distributer having a series of elongated openings placed obliquely as and for the purpose set forth.

In testimony whereof I affix my signature in presence of two witnesses.

FRANK RHIND.

Witnesses:

CHARLES R. AYRES,
HARRY M. TILESTON.